(12) United States Patent
Peri et al.

(10) Patent No.: US 7,500,024 B2
(45) Date of Patent: Mar. 3, 2009

(54) SIGNALING TO A PERIPHERAL VIA IRREGULAR READ OPERATIONS

(75) Inventors: Eyal Peri, Kibbutz Nir David (IL); Arik Priel, Givat Shmuel (IL); Leonid Shmulevitz, Rehovot (IL); Mordechai Teicher, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 555 days.

(21) Appl. No.: 11/356,983

(22) Filed: Feb. 21, 2006

(65) Prior Publication Data

US 2006/0195621 A1    Aug. 31, 2006

Related U.S. Application Data

(60) Provisional application No. 60/656,070, filed on Feb. 25, 2005.

(51) Int. Cl.
*G06F 3/00* (2006.01)

(52) U.S. Cl. ............. 710/7; 710/5; 710/36; 726/2; 726/26; 726/28; 726/30

(58) Field of Classification Search ............. None
See application file for complete search history.

(56) References Cited

U.S. PATENT DOCUMENTS

| 4,942,606 | A  | * | 7/1990 | Kaiser et al. ............. 726/19 |
| 5,596,713 | A  |   | 1/1997 | Deroo et al. |
| 5,960,172 | A  |   | 9/1999 | Hwang |
| 6,088,802 | A  |   | 7/2000 | Bialeck et al. |
| 7,234,005 | B2 | * | 6/2007 | Yoshitake ............. 710/9 |
| 2003/0028812 | A1 | * | 2/2003 | Stultz et al. ............. 713/202 |

OTHER PUBLICATIONS

Coatta, Terry et al., Configuration Management via Constraint Programming, 1992, IEEE Xplore, pp. 90-101.*

* cited by examiner

*Primary Examiner*—Eron J Sorrell
(74) *Attorney, Agent, or Firm*—Mark M. Friedman

(57) ABSTRACT

A peripheral communicates with a host according to a protocol such as USB. In case a user of the host is restricted by an operating system of the host from sending certain information to the peripheral, a pattern of protocol commands that includes one or more read commands is defined that sends the information despite the restriction. Preferably, all the protocol commands of the pattern are read commands.

16 Claims, 3 Drawing Sheets

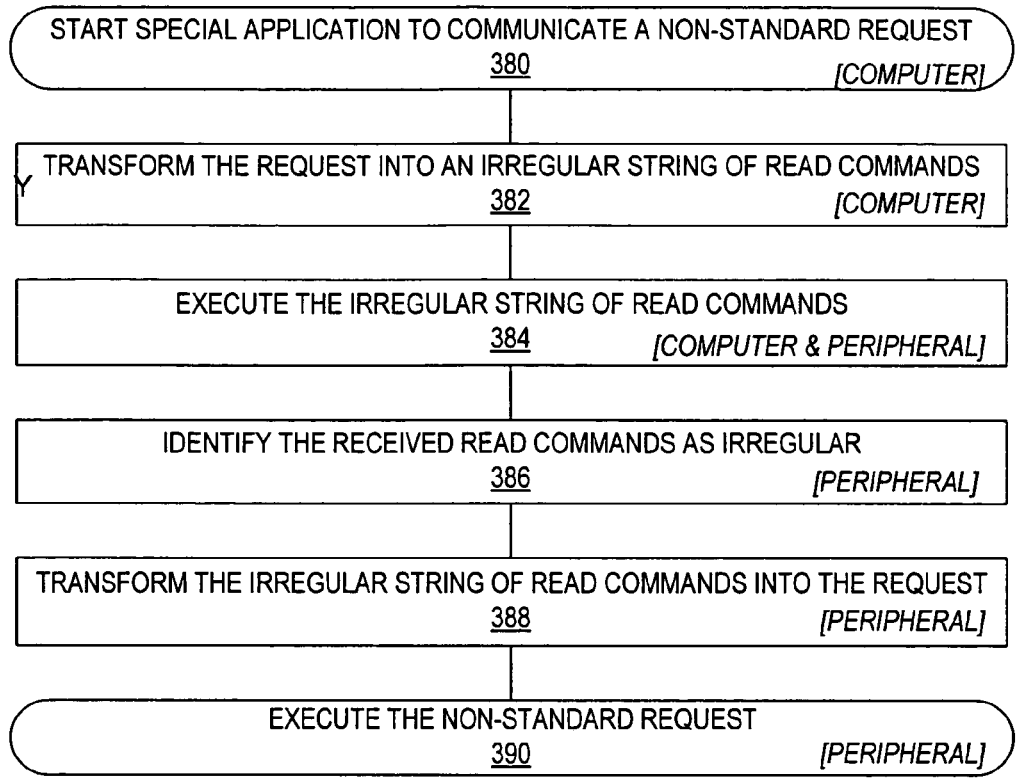
FIG. 6
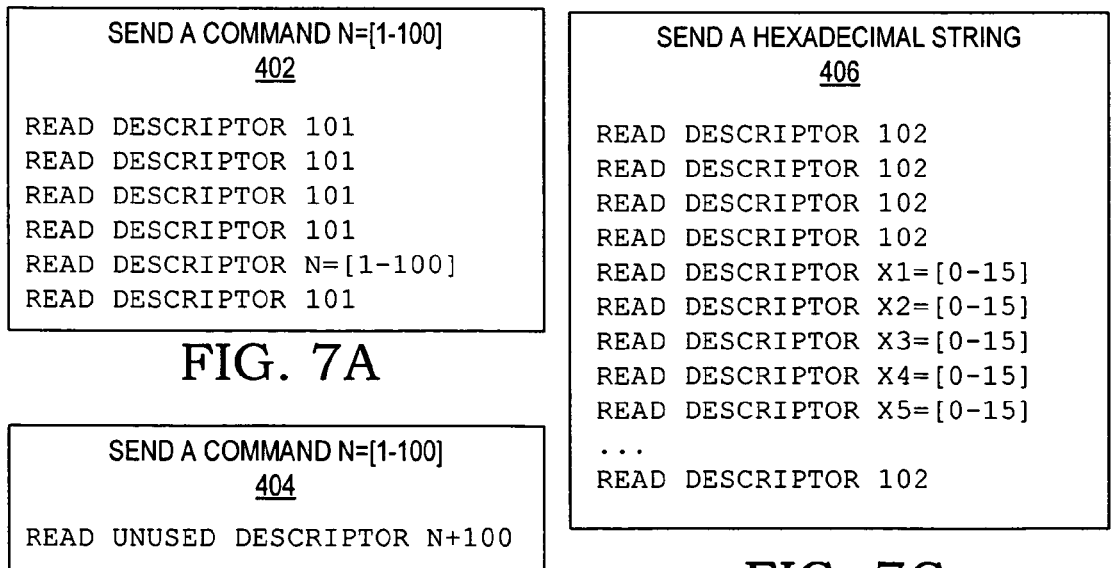
FIG. 7A
FIG. 7B
FIG. 7C

SIGNALING TO A PERIPHERAL VIA IRREGULAR READ OPERATIONS

This patent application claims the benefit of U.S. Provisional Patent Application No. 60/656,070, filed Feb. 25, 2005

FIELD AND BACKGROUND OF THE INVENTION

The present invention relates to peripheral devices for computers and in particular to USB peripheral devices that include programmable controllers.

Personal computers cooperate with a large variety of peripheral devices (peripherals), such as magnetic, optical and solid-state disks; printers; modems; keyboards; mice; etc. Many of the peripheral devices are removably-connected to the personal computer via a Universal Serial Bus (USB) connection. The communication between an application running on a personal computer and a peripheral that is needed for that application is controlled by the computer's operating system (OS), under standard protocols (the OS' services).

Under common conventions, some OS services are considered risky to an IT (information technology) system of an organization, and therefore are defined as restricted services accessible only to users that are classified as administrators. Non-administrator users are provided with access only to standard services, which represent no risk or low-risk to the IT system.

FIGS. 1-3 schematically illustrate the prior art with respect to computers, OS services and peripherals. FIG. 1 is a schematic high-level block diagram of a computer system 100 that includes a host computer 110, such as a personal computer (desktop, laptop or palmtop), or a cellular telephone enhanced with computing capabilities. System 100 also includes a client peripheral device 120 connected permanently or temporarily to computer 110 through a link 105. Computer 110 includes a CPU 112 that runs user applications 118. A Universal Serial Bus (USB) interface 116 in computer 110 provides electrical, logical and mechanical connections with a corresponding USB interface 126 in peripheral 120, to establish link 105. An operating system 114 governs the operation of CPU 112, and the way CPU 112 interfaces with applications 118 on the one hand and peripheral 120 on the other hand. Peripheral 120, in the context of the present invention, is smart in the sense that peripheral 120 includes a controller 122 operating under controller firmware 124. Functions 128 generally represent the hardware and software components for which peripheral 120 has been connected to computer 110. Exemplary functions 128 include printing, storage, data entry (e.g. keyboard, mouse), data display, a webcam etc. In some embodiments, functions 128 utilize controller 122 for processing, and in other embodiments functions 128 employ another controller: In any case, in the context of the present invention, controller 122, under programs from firmware 124, monitors and controls the data traffic between computer 110 and functions 128. For example, controller 122 receives, via link 105, USB packets that are issued by the services of operating system 114 and interprets those packets for functions 128. Link 105 is implemented via direct contact, cable or wireless communication.

FIG. 2 is a simplified structural diagram of operating system 114, which is actually a software package. Operating system 114 includes services 114S and permissions 114P. Services 114S are software routines that govern the general functionalities of computer 110 and the communication of computer 110 with peripheral 120. Thus, a user application 118 that needs access to a peripheral 120, such as a disk, a printer or a keyboard, calls the respective service from services 114S to interface with the required peripheral 120. Permissions 114P is a database of users or user types that specify whether a current computer user, identified through a previous login session or by entering a password, is permitted to access a certain service from among services 114S. For brevity and clarity the discussion hereinbelow will focus on two user types: administrators who have permission to access all services 114S, and non-administrators who have access to only standard services 114S, while being barred from accessing restricted services 114S that are more risky to the associated IT system. In this context, the IT system may be computer 110 and its contents as a minimum, or a corporate network that includes computer 110 in another typical case. It will be appreciated that more sophisticated permission hierarchies are common in the art, for allowing operating system 114 to determine whether a certain service from among services 114S is allowed to or barred from a certain user under permissions 114P.

FIG. 3 is a flowchart of the operation of computer system 100 under operating system 114. In step 200 application 118 orders a certain service of services 114S from CPU 112 running under operating system 114. In step 202, operating system 114 checks whether the requested service is standard, i.e. allowed for all users. If the answer is positive, then the requested service is executed in step 206. Otherwise, i.e. if the service is determined to be restricted in step 202, operating system 114 checks in permissions 114P whether the current user, as previously identified through a log-in procedure (or possibly by having successfully entered a password when prompted to do so), has administrator privileges, i.e. is eligible for the requested service. If the answer is positive, then the requested service is executed in step 206. Otherwise, service is denied in step 208, preferably while notifying the user by a message on the screen (not shown) of computer 110. The procedure ends in step 210, when operating system 114 is ready to receive and examine the next service order from an application 118.

New peripheral devices, features and applications are continually developed, and may require new operating system services to access them. Because computer operating systems are standardized across a large number of computers, it may take a very long time to accommodate such new services within OS 114. Therefore, developers of new peripherals, features and applications make any reasonable effort to apply an existing OS service instead of waiting for a new, dedicated service to be developed and integrated into OS 114. A problem arises, however, when a new, harmless peripheral or feature requires an OS service that is restricted because alternative uses of the same service are considered risky.

An example is a mass-storage device that interfaces with personal computers through the USB protocol, implemented under the Microsoft Windows™ OS. As long as the device is used for file read-write operations from and to its storage, existing standard OS services support seamless operation for all users. However, newer mass-storage devices, which include programmable built-in processors, offer more than just storage. For example, these mass storage devices can autonomously password-protect their content, or can double as authentication tokens. Such additional features often require specific data exchange with the built-in processor (e.g. password entry) or from an associated PC application (e.g. during authentication handshaking), but such data exchange requires restricted services that are barred by the Windows™ OS for non-administrator users.

There is thus a widely recognized need to provide a solution for non-administrator users to communicate with a peripheral device for implementing non-standard features that are normally barred by OS restrictions.

SUMMARY OF THE INVENTION

The present invention seeks to provide a solution for communicating with a peripheral for implementing non-standard features that are normally barred by the operating system for non-administrator users.

Specifically, the present invention provides a solution for communicating with the controller of a USB mass-storage device to affect the operation of the controller without relying on OS services.

The following terms are used hereinbelow:

A "computer" or "host" is a device offering data processing functionalities to a "user". Examples of computers include personal desktop, laptop and handheld computers, including a handheld computer that forms part of a cellular telephone. The present invention focuses on such devices that operate under an "operating system" ("OS") that offers "services" selectively to "administrators" and "non-administrators", as explained in the background above.

A "peripheral device", also abbreviated "peripheral", is a device that is connected to a computer to enhance the computer's functionality. The focus of the present invention is on using a USB connection between a computer and a peripheral. Such a connection can become effectively permanent, as is the case with a printer, or can be temporary, as normally is the case with a portable USB flash disk. The present invention focuses on the type of peripheral that includes a built-in processor that controls or at least monitors the data flow between the computer and the peripheral.

According to the present invention there is provided a method for a user, of a computer, who is restricted by an operating system of the computer from sending information to a peripheral, to send the information to the peripheral, the method including the steps of: (a) defining a pattern of protocol commands that enables the user to send the information from the computer to the peripheral, none of the protocol commands being separately restricted by the operating system, at least one of the protocol commands being a read command; (b) sending the pattern of the protocol commands from the computer to the peripheral; (c) receiving the pattern of the protocol commands, by the peripheral; and (d) interpreting the pattern of the protocol commands to receive the information, by the peripheral.

According to the present invention there is provided a peripheral, adapted to receive information sent from a host by a user who is restricted by an operating system of the host from sending the information to the peripheral, the peripheral including: (a) an interface for communicating with the host according to a protocol; (b) a mechanism for performing a function for the host in response to commands of the protocol that are issued by the host, the mechanism for performing the function including a controller; and (c) a mechanism, for receiving the information, that includes code that defines a pattern, of commands of the protocol, that enables the user to send the information from the host to the peripheral, none of the commands being separately restricted by the operating system, the pattern including at least one read command, such that the controller, upon receiving an irregular sequence of the commands of the protocol from the host: (i) recognizes the sequence as irregular, and (ii) if the sequence conforms to the pattern, interprets the sequence so as to receive the information.

According to the present invention there is provided a computer-readable storage medium having computer-readable-code embodied on the computer-readable storage medium, the computer-readable code for enabling a user of a host of a peripheral to send information from the host to the peripheral despite the user being restricted by an operating system of the host from sending the information to the peripheral, the computer-readable code including: (a) program code that defines a pattern, of commands of a protocol used by the host to communicate with the peripheral, that enables the user to send the information from the host to the peripheral, none of the commands being separately restricted by the operating system, the pattern including at least one read command; and (b) program code for translating the information into the pattern.

According to the present invention there is provided a method for a host to send a message to a peripheral through a standard protocol, the host operating under an operating system that disallows sending the message, in plain form, to the peripheral at least for one user, the method including: (a) transforming, by the host, the message into a pattern of commands, the pattern being allowed by the operating system to be sent to the peripheral for any user, at least one of the pattern's commands being a read command, the at least one read command being irregular; (b) sending, by the host, the pattern of commands to the peripheral; (c) receiving, by the peripheral, the pattern of commands; (d) identifying, by the peripheral, the at least one read command as irregular; and (e) interpreting, by the peripheral, the pattern of commands, to retrieve the message.

According to the present invention there is provided a peripheral cooperating with a host for receiving a message therefrom, the host transforming the message into a pattern of commands, at least one of the pattern's commands being a read command, the at least one read command being irregular, the peripheral including: (a) an interface configured to communicate with the host and receive the pattern of commands therefrom; and (b) a controller configured to process the pattern of commands, identify the at least one read command as irregular, and interpret the pattern of commands to retrieve the message.

According to the basic method of the present invention, a pattern of protocol commands is defined, for the peripheral, that invokes an operation that is restricted by the operating system of the computer. That the sending of information is "restricted" by the operating system means that the operating system forbids at least some users of the computer from sending the information, for example by forbidding those users from using one or more operating system services that are required to send the information. For example, in a computer that belongs to a organization, only users with administrator privileges are allowed by the operating system to use some operating system services. Examples of user activities supported by such sending of information include password protection of data stored in the peripheral and authentication handshaking. The protocol commands are such that none of the protocol commands is separately restricted by the operating system. In other words, any user of the computer is allowed to issue the protocol commands that are used in the pattern. The pattern includes at least one read command. The pattern of protocol commands is sent from the computer to the peripheral. The peripheral receives the pattern of protocol commands and interprets the pattern of protocol commands to receive the information. Note that the computer typically ignores whatever data the peripheral sends to the computer in response to the read command(s). The primary purpose of the read command(s) is to get the peripheral to receive the information.

Preferably, all the protocol commands of the pattern are read commands. Also preferably, at least one of the read commands is a command that reads a descriptor of the peripheral, most preferably an unused descriptor of the peripheral. Also preferably, at least two of the protocol commands are consecutive read commands that read the same descriptor of the peripheral.

Preferably, the pattern is an irregular pattern. An "irregular pattern" is understood herein to be a pattern of communication protocol commands that employs conventional signals in a way that is not expected to occur during normal operation, or whose occurrence during normal operation is so improbable that the possibility of such occurrence can be ignored.

A peripheral of the present invention includes an interface for communicating with a host according to a protocol, a mechanism for performing a function for the host in response to commands of the protocol that are issued by the host, and a mechanism for receiving information sent from the host by a user despite the user being restricted by an operating system of the host from sending the information from the host to the peripheral. The mechanism for receiving the information includes code that defines a pattern of the protocol commands that enables the user to send the information from the host to the peripheral. The pattern includes at least one read command. Upon receiving an irregular sequence of protocol commands from the host, the controller recognizes the sequence as irregular. If the sequence that has been recognized as irregular also conforms to the pattern, the controller interprets the sequence so as to receive the information. Preferably, the code that defines the pattern is embodied in firmware.

Preferably, all the protocol commands of the pattern are read commands.

Preferably, the protocol is a USB protocol.

The scope of the present invention also includes a system that includes such a peripheral and its host.

The scope of the present invention also includes a computer-readable storage medium having embodied thereon computer-readable code that enables a user of a host of a peripheral to send information from the host to the peripheral despite the user being restricted by the host's operating system from sending the information to the peripheral. The host uses commands of a protocol to communicate with the peripheral. The code includes program code that defines a pattern of such commands, none of which is separately restricted by the operating system, at least one of which is a read command, that enables the user to send the information to the peripheral. The code also includes program code for translating the information into the pattern.

BRIEF DESCRIPTION OF THE DRAWINGS

The invention is herein described, by way of example only, with reference to the accompanying drawings, wherein:

FIG. 6 is a flowchart of the operation of the systems of FIGS. 4 and 5;

FIGS. 7A-7C illustrate three preferred irregular patterns of descriptor read commands.

DESCRIPTION OF THE PREFERRED EMBODIMENTS

The present invention is of a method by which a host computer invokes an operation of a peripheral, and a corresponding peripheral. Specifically, the present invention can be used to bypass the standard services of the computer's operating system.

The principles and operation of a peripheral according to the present invention may be better understood with reference to the drawings and the accompanying description.

Under the USB standard, a USB peripheral has 256 descriptors, numbered 0-255, to provide information about the peripheral. Commonly, descriptor #0 is used to describe the language, descriptor #1 is used for describing the product, etc. In practice, most higher-number descriptors are unused across the industry, and are left optional for manufacturers of specific peripherals for describing device parameters, and user applications are allowed to read all 256 descriptors with no restriction even for non-administrators.

The present invention uses an irregular sequence of descriptor read operations, to send information to the controller of a USB peripheral. Because such read commands are allowed also for non-administrators, the present invention allows a user application to send to the controller of a peripheral any desirable information, as described below.

Figure 1:
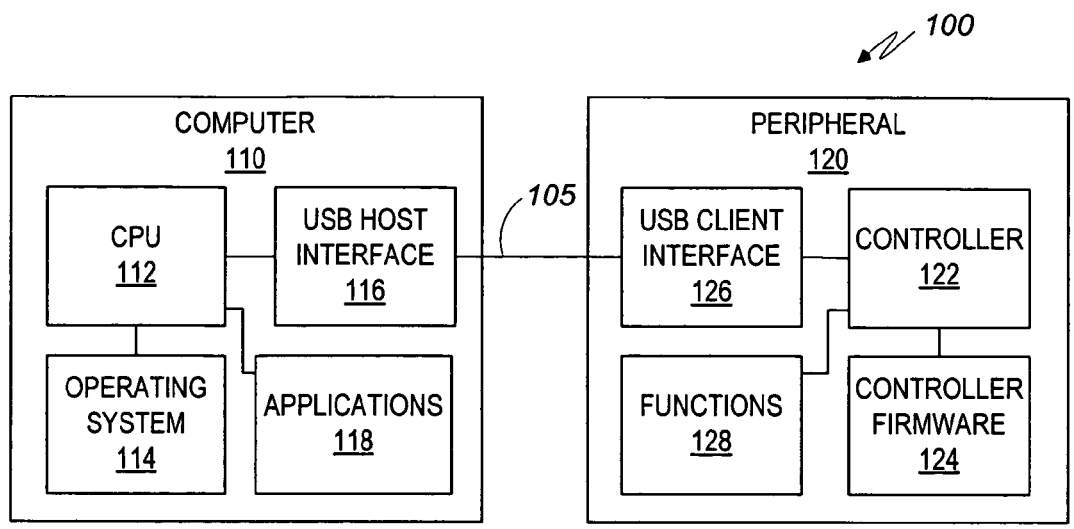
FIG. 1 is a schematic high-level block diagram of a background art computer system.
Figure 2:
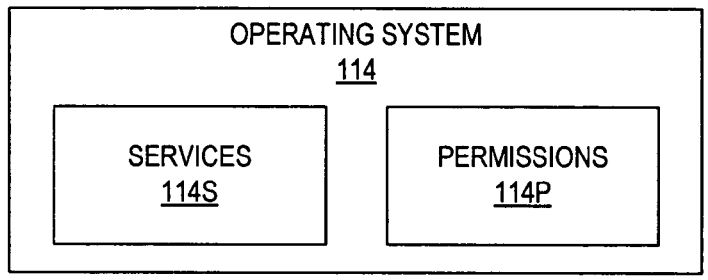
FIG. 2 is a simplified diagram of the operating system of the computer of the system of FIG. 1.
Figure 3:
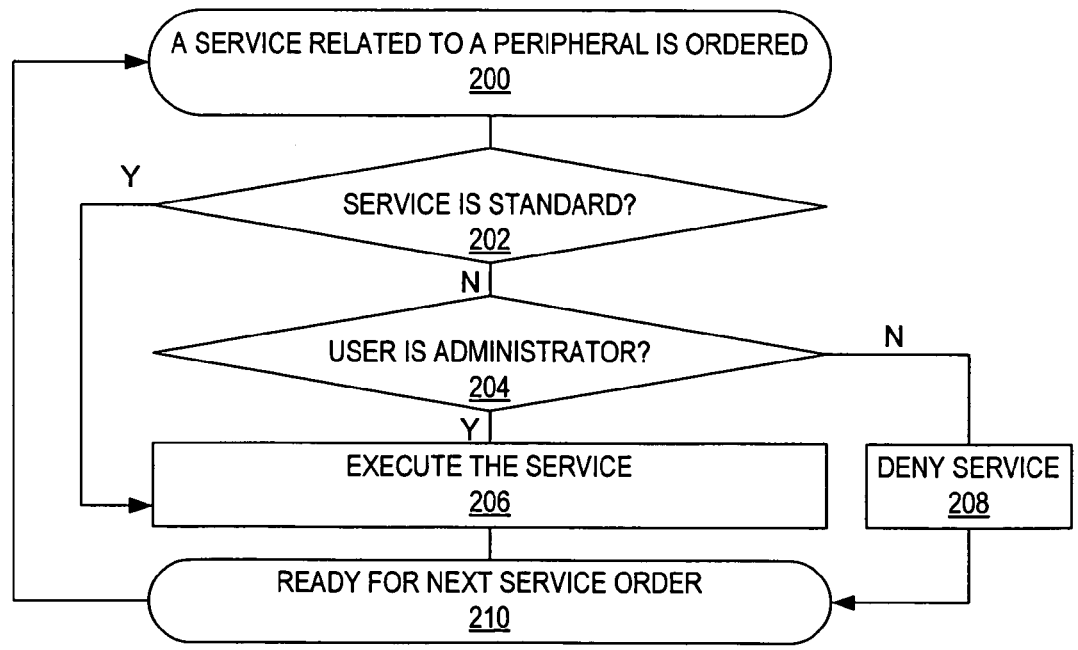
FIG. 3 is a flowchart of the operation of the system of FIG. 1.
Figure 4:
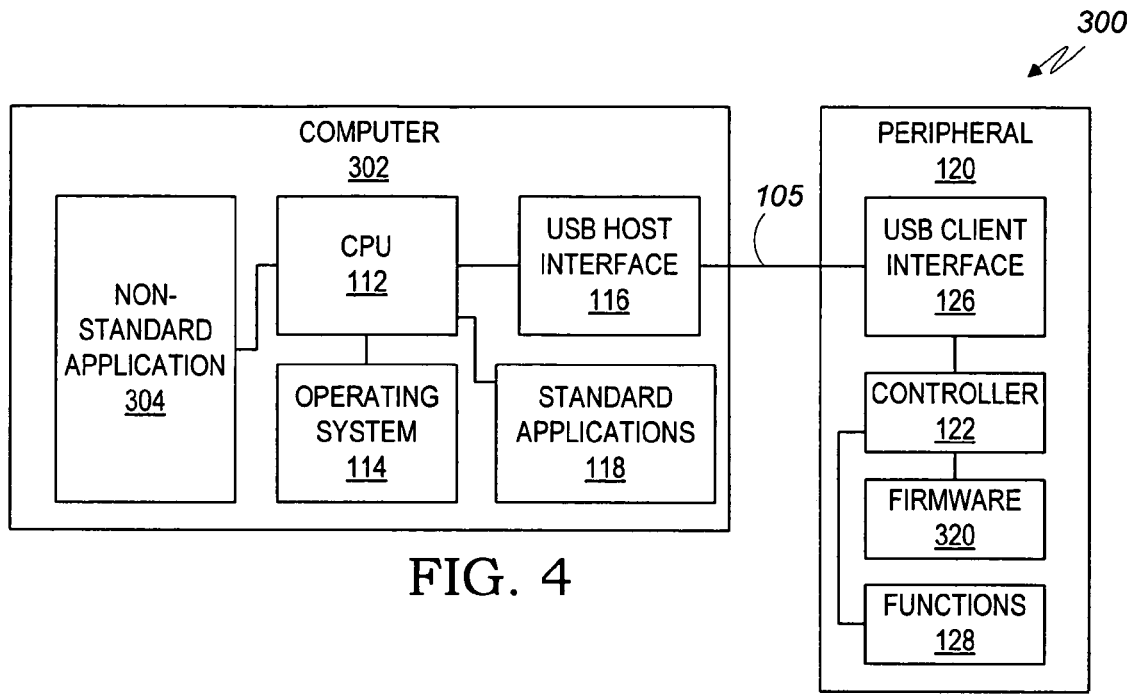
FIGS. 4 and 5 are schematic high-level block diagrams of computer systems of the present invention.

Referring again to the drawings, FIG. 4 is a schematic high-level block diagram of a first preferred embodiment 300 of the present invention. Embodiment 300 includes a computer 302 and a peripheral 120. Computer 302, for example a personal desktop computer, includes CPU 112, operating system 114 and standard applications 118 as in computer 110 of the prior art described with respect to FIG. 1. Applications 118, such as a word processor, are standard in the sense that they are allowed for all users of computer 302, including non-administrators. Additionally, computer 302 also stores a restricted (non-standard) application 304 that requires sending information to peripheral 120 in a manner that is not supported by operating system 114 or that requires the use of OS services that are barred from non-administrators.

Figure 5:
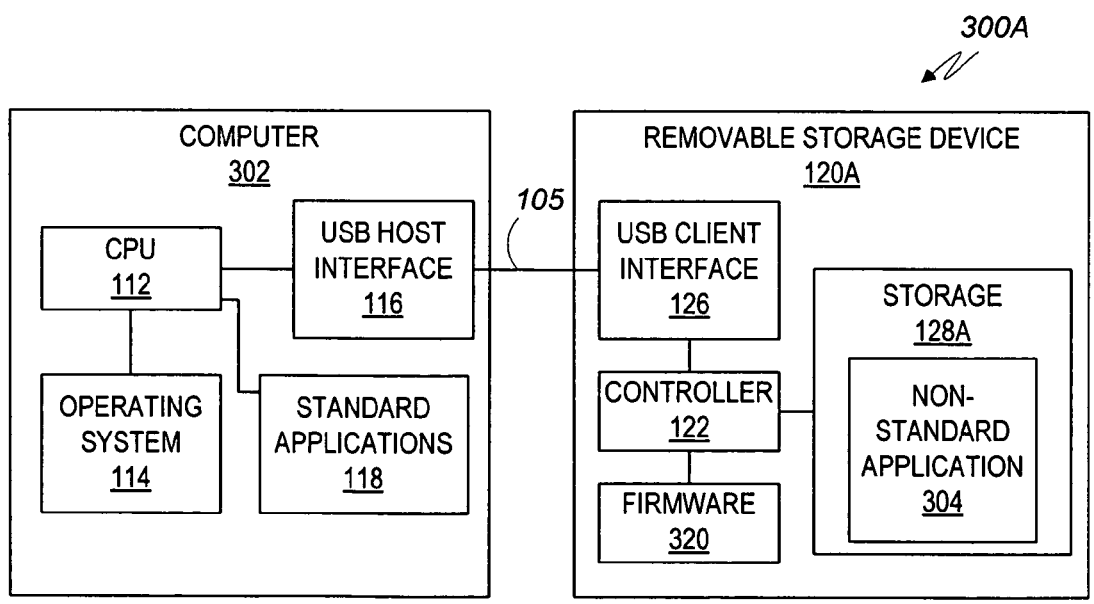

FIG. 5 is a schematic high-level block diagram of a preferred embodiment 300A alternative to embodiment 300 of FIG. 4. In embodiment 300A, the peripheral is a removable storage device 120A having a storage medium 128A, and the non-standard application 304 moves from being stored in and loaded from computer 302 (FIG. 4) to being stored in and loaded from removable storage device 120A (FIG. 5). Because computer applications can easily run from internal storage (FIG. 4) or external storage (FIG. 5), both embodiments 300 and 300A are similar in running application 304.

The present invention allows non-standard application 304 of FIG. 4 or FIG. 5 to communicate with peripheral 120 or 120A through a standard protocol, by generating at computer 302 universally-allowed actions but under irregular patterns that are identified and interpreted by controller 122. Controller 122 of peripheral 120 or 120A monitors all communication and is programmed through its firmware 320 to detect such irregular patterns in order to identify and interpret the non standard requests as coded input signals, as described below. As in background art computer system 100, USB interface 116 in computer 302 provides electrical, logical and mechanical connections with corresponding USB interface in peripheral 120 or 120A to establish link 105. Also as in background art computer system 100, functions 128 represent the hardware and software components for which peripheral 120 or 120A has been connected to computer 302.

In an embodiment of the present invention in which code that enables computer 302 to translate a non-standard request by application 304 into an irregular sequence of read commands is included in the code of application 304 itself, storage medium 128A of peripheral 120A constitutes an example of a computer-readable storage medium in which is embedded computer-readable code for implementing the present invention.

FIG. 6 is a flowchart that schematically describes the generation and interpretation of such irregular patterns. In step 380, non-standard application 304 running on computer 302 initiates the production of a non-standard request. In step 382, computer 302 transforms the non-standard request to an irregular sequence of read commands, each of the individual read commands being standard and universally-allowed. In step 384, the irregular sequence of read commands is executed through a communication between computer 302 and peripheral 120 or 120A through link 105. In step 386, controller 122, that monitors all communications received by peripheral 120/120A, detects that the sequence of received read commands is irregular, which is followed in step 388 by controller 122 interpreting the coded message from the irregular sequence according to the coding convention used jointly by non-standard application 304 and by controller firmware 320. In step 390, the procedure is concluded as peripheral 120 or 120A executes the non-standard command interpreted in step 388.

FIGS. 7A-7C illustrate three exemplary preferred embodiments for coding commands using an irregular sequence of reading descriptors from a USB device 120 or 120A (FIGS. 4 and 5). In these examples, the descriptors are read using the USB "GET_DESCRIPTOR" Standard Device request that is defined in Section 9.4 of the USB specification. FIG. 7A illustrates a coding method 402 that allows sending a command coded by a command number N in the range 1 to 100. The command sequence generated by computer 302 starts with four consecutive reads of descriptor 101. Since such repeated reads of the same descriptor makes no sense technically, this read sequence is identified as irregular, and then controller 122 looks at the next read command, which is expected to be reading descriptor N in the range of 1-100, and interprets that read command as command #N. The next read operation of descriptor 101 signals to controller 122 that the coding sequence has been completed successfully.

The exemplary preferred embodiment 404 of FIG. 7B assumes that none of peripherals 120/120A ever uses descriptors 101-200, and therefore no related standard application 118 is ever expected to attempt reading a descriptor numbered in the range 101-200. Such assumptions can be safely made, for example, by a provider who controls the specifications of a family of peripherals 120/120A. In such a case, the mere reference to a descriptor N in the range 101-200 within a read command sent from computer 302 to a peripheral 120/120A, signals a special command whose index is calculated by subtracting 100 from the read descriptor number (e.g. a read command related to descriptor 159 is interpreted by controller 122 as a command #59).

FIG. 7C illustrates another exemplary preferred coding method 406 devised to send any type and quantity of coded data from computer 302 to peripheral 120/120A (FIGS. 4-5). Because any type and quantity of data can be represented by a string of hexadecimal digits, computer 302 first sends an irregular sequence of four read commands for descriptor #102, and then a sequence of read commands for descriptors in the range 0-15, each representing a respective hexadecimal digit. When the entire string has been completed, another read command for descriptor #102 signals the end of the string.

It should be noted that because the present invention is based on cooperation between computer 302 (which runs non-standard application 304) and peripheral 120/120A (which detects and interprets the irregular read operations), the read commands, once identified as irregular by controller 122, do not need to be executed in the regular manner (i.e. sending the content of the respective descriptor from peripheral 120/120A to computer 302). Thus the execution of step 384 of FIG. 6 may be reduced to sending read commands without actually receiving back the content of the respective descriptors. However, the procedure of FIG. 6 works well also if such descriptors are read by controller 122 and sent to computer 302 and are ignored by computer 322.

While the invention has been described with respect to a limited number of embodiments, it will be appreciated that many variations, modifications and other applications of the invention may be made.

What is claimed is:

1. A method for a user, of a computer, who is restricted by an operating system of the computer from sending information to a peripheral, to send the information to the peripheral, the method comprising the steps of:
 (a) defining a pattern of protocol commands that enables the user to send the information from the computer to the peripheral, none of said protocol commands being separately restricted by the operating system, at least one of said protocol commands being a read command;
 (b) sending said pattern of said protocol commands from the computer to the peripheral;
 (c) receiving said pattern of said protocol commands, by the peripheral; and
 (d) interpreting said pattern of said protocol commands to receive said information, by the peripheral.

2. The method of claim 1, wherein all said protocol commands of said pattern are read commands.

3. The method of claim 1, further comprising the step of:
 (e) effecting password protection of data stored in the peripheral, in accordance with the information, by the peripheral.

4. The method of claim 1, further comprising the step of:
 (e) effecting authentication handshaking, in accordance with the information, by the peripheral.

5. The method of claim 1, wherein said at least one read command includes at least one command that reads a descriptor of the peripheral.

6. The method of claim 5, wherein said descriptor is an unused descriptor of the peripheral.

7. The method of claim 1, wherein at least two of said protocol commands are consecutive read commands that read a common descriptor of the peripheral.

8. The method of claim 1, wherein said pattern is irregular.

9. A peripheral, adapted to receive information sent from a host by a user who is restricted by an operating system of the host from sending the information to the peripheral, the peripheral comprising:
 (a) an interface for communicating with the host according to a protocol;
 (b) a mechanism for performing a function for the host in response to commands of said protocol that are issued by the host, said mechanism for performing said function including a controller; and
 (c) a mechanism, for receiving the information, that includes code that defines a pattern, of commands of said protocol, that enables the user to send the information from the host to the peripheral, none of said commands being separately restricted by the operating system, said pattern including at least one read command, such that said controller, upon receiving an irregular sequence of said commands of said protocol from the host:
(i) recognizes said sequence as irregular, and
(ii) if said sequence conforms to said pattern, interprets said sequence so as to receive the information.

10. The peripheral of claim 9, wherein all said protocol commands of said pattern are read commands.

11. The peripheral of claim 9, wherein said code is embodied in firmware.

12. The peripheral of claim 9, wherein said protocol is a USB protocol.

13. A system comprising:
(a) the peripheral of claim 9; and
(b) the host of claim 9.

14. A computer-readable storage medium having computer-readable code embodied on the computer-readable storage medium, the computer-readable code for enabling a user of a host of a peripheral to send information from the host to the peripheral despite the user being restricted by an operating system of the host from sending the information to the peripheral, the computer-readable code comprising:
(a) program code that defines a pattern, of commands of a protocol used by the host to communicate with the peripheral, that enables the user to send the information from the host to the peripheral, none of said commands being separately restricted by the operating system, said pattern including at least one read command; and
(b) program code for translating the information into said pattern.

15. A method for a host to send a message to a peripheral through a standard protocol, the host operating under an operating system that disallows sending the message, in plain form, to the peripheral at least for one user, the method comprising:
(a) transforming, by the host, the message into a pattern of commands, said pattern being allowed by the operating system to be sent to the peripheral for any user, at least one of said pattern's commands being a read command, said at least one read command being irregular;
(b) sending, by the host, said pattern of commands to the peripheral;
(c) receiving, by the peripheral, said pattern of commands;
(d) identifying, by the peripheral, said at least one read command as irregular; and
(e) interpreting, by the peripheral, said pattern of commands, to retrieve the message.

16. A peripheral cooperating with a host for receiving a message therefrom, the host transforming the message into a pattern of commands, at least one of the pattern's commands being a read command, the at least one read command being irregular, the peripheral comprising:
(a) an interface configured to communicate with the host and receive the pattern of commands therefrom; and
(b) a controller configured to process the pattern of commands, identify the at least one read command as irregular, and interpret the pattern of commands to retrieve the message.

* * * * *